United States Patent
Koh (10) Patent No.: US 10,591,943 B2
(45) Date of Patent: *Mar. 17, 2020

(54) ENERGY STORAGE METHOD AND SYSTEM TO POWER FUNCTIONAL SAFETY DIAGNOSTIC SUBSYSTEM

(71) Applicant: Rockwell Automation Asia Pacific Business Ctr. Pte. Ltd., Singapore (SG)

(72) Inventor: Kian Kiat Koh, Singapore (SG)

(73) Assignee: Rockwell Automation Asia Pacific Business Ctr. Pte. Ltd., Singapore (SG)

( * ) Notice: Subject to any disclaimer, the term of this patent is extended or adjusted under 35 U.S.C. 154(b) by 47 days.

This patent is subject to a terminal disclaimer.

(21) Appl. No.: 15/861,932

(22) Filed: Jan. 4, 2018

(65) Prior Publication Data
US 2018/0136682 A1 May 17, 2018

Related U.S. Application Data

(63) Continuation of application No. 14/621,967, filed on Feb. 13, 2015, now Pat. No. 9,870,013.

(51) Int. Cl.
| | | |
|---|---|---|
| H02J 3/14 | (2006.01) | |
| G05F 1/625 | (2006.01) | |
| G06F 1/26 | (2006.01) | |
| G05B 11/01 | (2006.01) | |
| G05B 15/02 | (2006.01) | |

(52) U.S. Cl.
CPC ............. *G05F 1/625* (2013.01); *G05B 11/01* (2013.01); *G05B 15/02* (2013.01); *G06F 1/263* (2013.01)

(58) Field of Classification Search
CPC ......................................................... H02J 3/14
USPC ......................................................... 700/295
See application file for complete search history.

(56) References Cited

U.S. PATENT DOCUMENTS

| | | |
|---|---|---|
| 5,077,572 A | 12/1991 | Morisawa |
| 5,193,176 A | 3/1993 | Brandin |
| 5,448,719 A | 9/1995 | Schultz et al. |
| 5,784,548 A | 7/1998 | Liong et al. |
| 5,832,282 A | 11/1998 | Pate et al. |
| 5,889,933 A | 3/1999 | Smith |
| 5,944,828 A | 8/1999 | Matsuoka |
| 6,079,026 A | 6/2000 | Berglund et al. |
| 6,275,946 B1 | 8/2001 | Meir |
| 6,298,393 B1 | 10/2001 | Hopsecger |
| 6,535,996 B1 | 3/2003 | Brewer et al. |

(Continued)

OTHER PUBLICATIONS

European Search Report dated Jun. 10, 2016 for Application No. EP 16 15 3984.

*Primary Examiner* — Suresh Suryawanshi
(74) *Attorney, Agent, or Firm* — Fay Sharpe LLP (57) ABSTRACT

Disclosed is an industrial automation control system, method and apparatus and method of operation including a diagnostic domain subsystem powered by an energy storage subsystem. According to an exemplary embodiment, a diagnostic domain subsystem is configured to perform diagnostics of one or more conditions associated with a functional domain subsystem, where the energy storage subsystem powers the diagnostic subsystem during a normal mode of operation and the energy storage subsystem powers the diagnostic domain and functional domain during a power failure mode and/or power cycling mode.

25 Claims, 8 Drawing Sheets

(56) References Cited

U.S. PATENT DOCUMENTS

| | | | |
|---|---|---|---|
| 6,567,899 B2 | 5/2003 | Ghosh et al. | |
| 6,888,267 B2 | 5/2005 | Floro et al. | |
| 6,892,147 B2 | 5/2005 | Bui et al. | |
| 7,414,854 B1 | 8/2008 | Douglas | |
| 7,535,201 B2 | 5/2009 | Nakazawa | |
| 7,617,412 B2 | 11/2009 | Shelvik et al. | |
| 7,622,825 B2 | 11/2009 | Brune et al. | |
| 7,634,688 B2 | 12/2009 | Madter et al. | |
| 7,788,531 B2 | 8/2010 | Adams | |
| 8,001,419 B2 | 8/2011 | Killian et al. | |
| 8,239,696 B2 | 8/2012 | Zhao | |
| 8,671,686 B2* | 3/2014 | Pinkerton | G06F 1/30 60/646 |
| 8,868,957 B2 | 10/2014 | Davis et al. | |
| 9,215,046 B2 | 12/2015 | Mizoguchi | |
| 9,225,202 B1 | 12/2015 | Kim et al. | |
| 2004/0190210 A1 | 9/2004 | Leete | |
| 2007/0035275 A1 | 2/2007 | Yang et al. | |
| 2009/0125156 A1 | 5/2009 | Killian et al. | |
| 2009/0174256 A1 | 7/2009 | Lanus et al. | |
| 2010/0146333 A1 | 6/2010 | Yong et al. | |
| 2015/0318701 A1* | 11/2015 | vor Dem Esche | H02J 3/30 307/19 |

\* cited by examiner

ENERGY STORAGE METHOD AND SYSTEM TO POWER FUNCTIONAL SAFETY DIAGNOSTIC SUBSYSTEM

CROSS-REFERENCE TO RELATED APPLICATION

This application is a continuation of U.S. application Ser. No. 14/621,967 filed Feb. 13, 2015 (Feb. 13, 2015), now assigned U.S. Pat. No. 9,870,013, and the entire disclosure of said prior application is hereby expressly incorporated by reference into the present specification.

BACKGROUND INFORMATION

The subject matter disclosed herein relates to industrial automation controllers. Specifically, the subject matter disclosed herein relates to an industrial automation controller including an energy storage subsystem to power a diagnostic subsystem.

Industrial automation controllers are special purpose computers used for the control of industrial machines and/or processes. While executing a stored program, they read inputs from one or more controlled machines/processes and, according to the logic of a contained control program, provide outputs to the same and/or different controlled machine(s)/process(es) based upon the inputs. Industrial controllers must provide "real-time" control (i.e., control in which control outputs are produced predictably and timely in response to given control inputs), and must provide for extremely reliable operation and recovery from faults. In this latter regard, critical data contained in processor registers and other volatile memory (e.g., DRAM, SRAM, SDRAM, etc.) of the controller must be saved or "backed-up" to a non-volatile memory (e.g., flash EEPROM, disk, etc.) in the event of loss of electrical power.

Furthermore, end users of industrial controllers require maintaining user memory and state of controllers over power failure and power cycling. With increasing user requirements of user program size and challenges of battery maintenance, some controllers have opted for saving user memory into sold-state memory upon power fail and power cycling. This operation is abbreviated as save-to-flash operation. Therefore, sufficient energy storage needs to be generated and stored during normal operation in order to harvest stored energy as backup to perform save-to-flash operation during power fail.

In addition to backing up controller states and user memory during power cycling or failure, a functional safety integrated controller, depending on the level of safety integrity required to meet, may require a wide-input tolerant and large size regulator to power both a functional safety domain subsystem and a diagnostic domain subsystem, or separate and dedicated power supply sources may be provided for functional safety related subsystems and diagnostic related subsystems respectively to reduce risk of having common cause failure that potential compromises both safety function and diagnostic concurrently in single fault.

Both requirements described above including memory back-up and dedicated power supplies drive hardware design to be complicated, redundant with multiple backup supplies or regulators, expensive and consuming large real estate.

This disclosure and the exemplary embodiments described herein, provide an industrial control system, controller and method including a memory back-up subsystem which reduces risk of common cause failures without the need to have separate and dedicated power supply sources, or a relatively wide-input tolerant and large size regulator.

INCORPORATION BY REFERENCE

U.S. Pat. No. 8,001,419, by Killian et al., issued Aug. 16, 2011 and entitled "ENERGY STORAGE MODULE", and U.S. Pat. No. 7,617,412, by Shelvik et al., issued Nov. 10, 2009 and entitled "SAFETY TIMER CROSSCHECK DIAGNOSTIC IN A DUAL-CPU SAFETY SYSTEM", are incorporated herein by reference in their entirety.

BRIEF DESCRIPTION

In one embodiment of this disclosure, described is an industrial automation control system comprising: a power supply subsystem including one or more output voltage rails; a functional domain subsystem including processor circuitry, volatile memory and non-volatile memory configured to monitor and/or control one or more remote devices operatively associated with the industrial automation control system, and the functional domain subsystem operatively powered by one of the one or more output voltage rails during a normal mode of operation; a diagnostic domain subsystem configured to perform diagnostics of one or more conditions associated with the functional domain subsystem; and an energy storage subsystem operatively connected to one of the one or more output voltage rails and configured to store energy supplied from the one of the one or more voltage rails during the normal mode of operation and operatively power the diagnostic subsystem using the stored energy during the normal mode of operation, and the energy storage subsystem configured to operatively power the diagnostic subsystem and functional domain subsystem during a control system operation associated with a failure of one or more of the output voltage rails due to one or more of powering down the industrial automation control system, and a fault associated with an output voltage rail associated with the power supply subsystem.

In another embodiment of this disclosure, described is an industrial automation control system implemented method for powering a diagnostic domain subsystem associated with the industrial automation control system, the industrial automation control system including a power supply subsystem including one or more output voltage rails, a functional domain subsystem configured to monitor and/or control one or more remote device associated with the industrial automation control system, a diagnostic domain subsystem configured to perform diagnostics of one or more conditions associated with the functional domain subsystem, and an energy storage subsystem operatively connected to one of the one or more output voltage rails and configured to store energy from the one of the one or more output voltage rails, the method comprising: a) monitoring an output voltage of the energy storage subsystem; b) determining if the output voltage is within a predetermined range; and c) if the output voltage is within the predetermined range, selectably powering the diagnostic domain subsystem.

In still another embodiment of this disclosure, described is an integrated functional safety controller comprising: a main module comprising: a first processor and associated circuitry; a second processor and associated circuitry; volatile memory; non-volatile memory; and an energy storage subsystem, the main module configured to provide a functional domain subsystem to monitor and/or control one or more remote devices, and provide a diagnostic domain subsystem configured to monitor and store in the non-volatile memory one or more conditions associated with the functional domain subsystem; a backplane operatively associated with the main module, the backplane configured to provide a first output voltage rail and a second output voltage rail operatively associated with powering the main module, wherein the main module and backplane are configured to power the functional domain subsystem by the first output voltage rail during a normal mode of operation, and the energy storage subsystem is operatively connected to the second output voltage rail and stores energy supplied from the second voltage rail during the normal mode of operation and operatively power the diagnostic subsystem using the stored energy during the normal mode of operation, and the energy storage subsystem operatively powers the diagnostic subsystem and functional domain subsystem during a control system operation associated with a failure of one or both of the first output voltage rail and the second output voltage rail due to one or more of powering down the controller, a fault associated with the first output voltage rail, and a fault associated with the second output voltage rail.

DETAILED DESCRIPTION

As discussed in the background, traditionally both a functional safety related domain and a diagnostic domain associated with an industrial controller are powered from a common power source, causing the hardware design to have an expensive, wide-input tolerant and relatively large size regulator in either one of the domain to prevent single fault compromising both safety function and diagnostic. Alternatively, separate and dedicated power sources may be used to independently power the safety function domain and the diagnostic function domain, which also results in a hardware design which is complicated and expensive. By utilizing an energy storage subsystem, as disclosed herein, to power the diagnostic-related subsystem (e.g. voltage monitor FPGA and ADC), as well as powering the functional safety-related subsystem from an independent power source, the controller hardware design achieves a high confidence level of reducing risk of common cause failure. In other words, the failure of the power source caused by a single fault will not go undetected due to the operatable independence of the power source relative to the energy storage subsystem, and the fault will be detected and responded to safely with an appropriate diagnostic measure(s) implemented. In addition, upon power fail and power cycling, the energy storage powered diagnostic domain, as disclosed herein, is switched to perform save-to-flash operation without additional hardware.

As another exemplary example, by utilizing an energy storage subsystem, as disclosed herein, that draws power from a different power source (e.g., power supply 24V rail) than the functional domain power source to power the diagnostic-related subsystem (e.g. voltage monitor FPGA and ADC), as well as powering the functional safety-related subsystem from a dedicated and independent power source (e.g. power supply 5V rail), the controller hardware design achieves a high confidence level of reducing risk of common cause failure. In other words, the failure of one rail caused by a single fault will not go undetected due to the independence of the power source, and the fault will be detected and responded to safely with an appropriate diagnostic measure (s) implemented. In addition, upon power fail and power cycling, the energy storage powered diagnostic domain, as disclosed herein, is switched to perform save-to-flash operation without additional hardware.

Applying the hardware architecture provided herein, the safety integrity level requirements of an integrated safety controller can be satisfied by insuring independence of the safety function-related subsystem from the diagnostic-related subsystem, as well as potentially reducing hardware cost, size and redundancy to support user memory persistent features utilizing save-to-flash operation.

Figure 1:
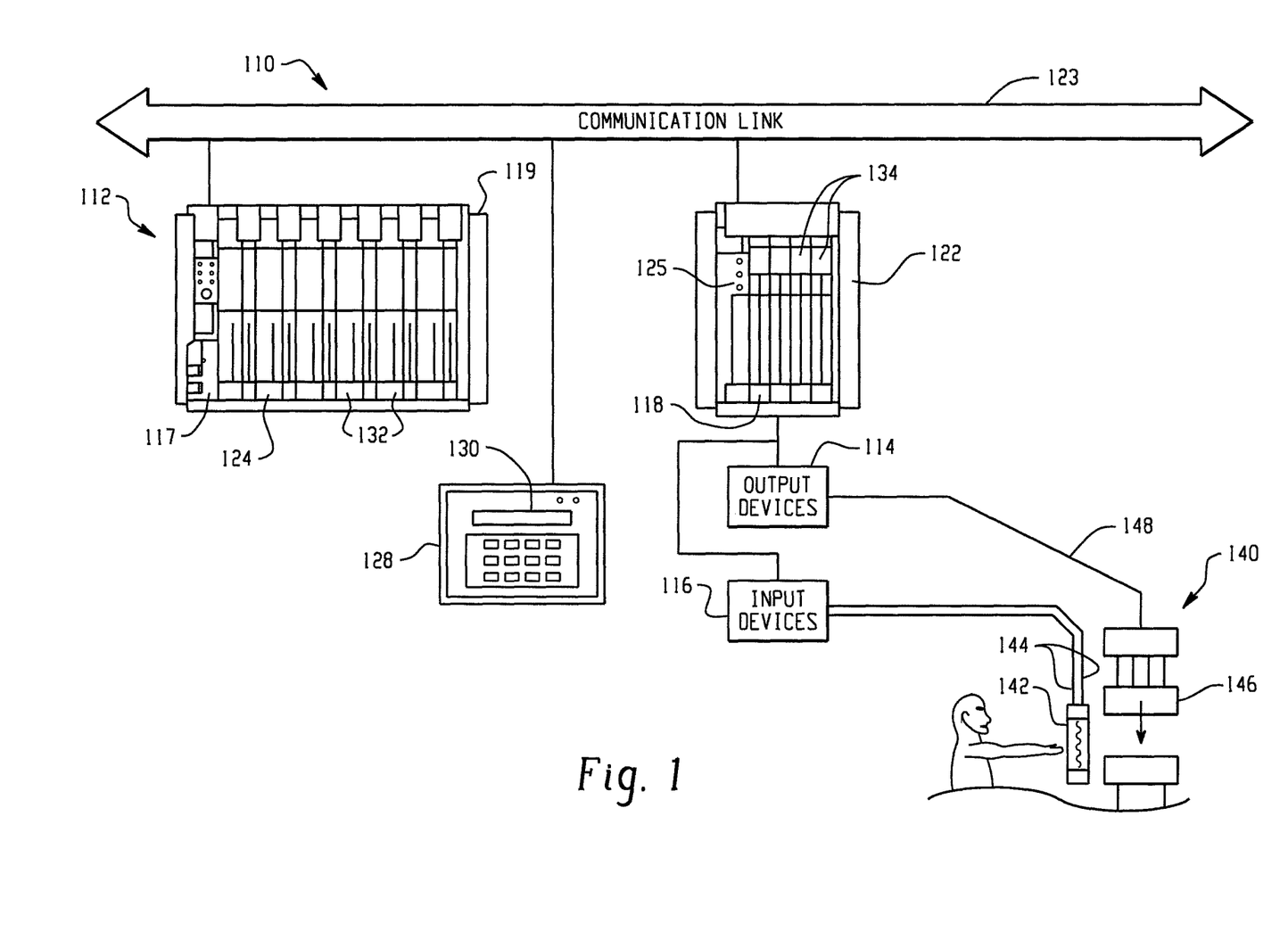
FIG. 1 is a block diagram of an industrial automation control system according to an exemplary embodiment of this disclosure.

Referring now to FIG. 1, an exemplary industrial control system 110 is illustrated. The industrial control system 110 utilizes programmable input/output (I/O) circuits that are described in greater detail below. It should be noted that the industrial control system 110 is merely one example of an industrial control system that could utilize the presently disclosed subject matter, and that other systems are also possible.

The industrial control system 110 comprises a programmable control system 112 that controls the output status of a plurality of output devices 114 based on the input status of a plurality of input devices 116. To this end, the programmable control system 112 has a microprocessor-based processor module 117 that executes a stored control program which defines the manner in which the output devices 114 are controlled.

The processor module 117 communicates with the I/O devices 114 and 116 by way of an I/O module 118. In particular, the processor module 117 transmits a digital representation of the desired output status of the output devices 114 to the I/O module 118. Based on the digital representation of the desired output status of the output devices 114, the I/O module 118 produces an output control signal that is capable of driving the output devices 114 in the desired manner. Likewise, the processor module 117 receives a digital representation of the input status of the input devices 116 from the I/O module 118. The I/O module 118 produces the digital representation of the input status of the input devices 116 based on input status signals received from the input devices 116.

In the illustrated embodiment, the processor module 117 is disposed in a rack 119 and the I/O module 118 is disposed in a separate rack 122, and communication between the processor module 117 and the I/O module 118 occurs by way of a Remote I/O network or other communication link 123. To this end, the industrial control system 110 further comprises an integrated communication port, adapter or scanner module 124 and an adapter module 125. The adapter or scanner module 124 is mounted in the same rack 119 as the processor module 117 and communication between the two modules occurs by way of a common backplane that is incorporated into the rack 119. Likewise, the adapter module 125 is mounted in the same rack as the I/O module 118 and communication between the two occurs by way of a common backplane that is incorporated into the rack 122. Thus, information is transmitted from the processor module 117 to the I/O module 118 through the backplane of the rack 119, through the scanner module 124, through the communication link 123, through the adapter module 125, and through the backplane of the rack 122. Information is transmitted from the I/O module 118 to the processor module 117 by way of the opposite path.

The industrial control system 110 also comprises other features such as an operator interface 128 and a message display 130. The operator interface 128 and message display 130 facilitate human interaction with the industrial control system 110. Additionally, the rack 119 contains a plurality of other modules 132. The other modules 132 could include, for example, one or more Ethernet modules, Data Highway or Data Highway Plus modules, and/or a plurality of other types of modules, all of which plug into the same common backplane. Finally, the I/O rack 122 contains a plurality of additional I/O modules 34.

Of course, numerous other arrangements are possible. For example, the I/O module 118 could be disposed in the same rack 119 as the processor module 117. Also, an industrial control system could be implemented without using rack-mounted modules.

The I/O module 118 transmits the analog output control signals to the output devices 114 and receives the analog input status signals from the input devices 116. To this end, the I/O module 118 includes digital-to-analog (D/A) converters (not illustrated) that convert digital representations of desired output status received from the processor module 117 by way of the communication link 123 to signals that are used as inputs to I/O circuits. The I/O circuits use these inputs to produce analog output control signals to control the output devices 114. Similarly, I/O module 118 also includes analog-to-digital A/D converters (not illustrated) that convert outputs of I/O circuits into digital representations of the input status that can be transmitted by way of the communication link 123 to the processor module 117. The outputs of the I/O circuits are produced based upon the analog input status signals received from the input devices 116.

In a present example, a controlled safety process 140 includes a light curtain 142 providing redundant light curtain signals 144 to the I/O module 118 and a press 146 that may be stopped via a halt signal 148 sent to the press 146 from the I/O module 118. The safety process 140 is designed to stop the press 146 if the plane of the light curtain 142 is crossed. The speed of response, i.e., the safety reaction time, of the I/O module 118 in halting the press 146 after an object cross the plane of the light curtain 142 is factored into the calculation to determine the required amount of separation between the light curtain 142 and the press 146.

Figure 2:
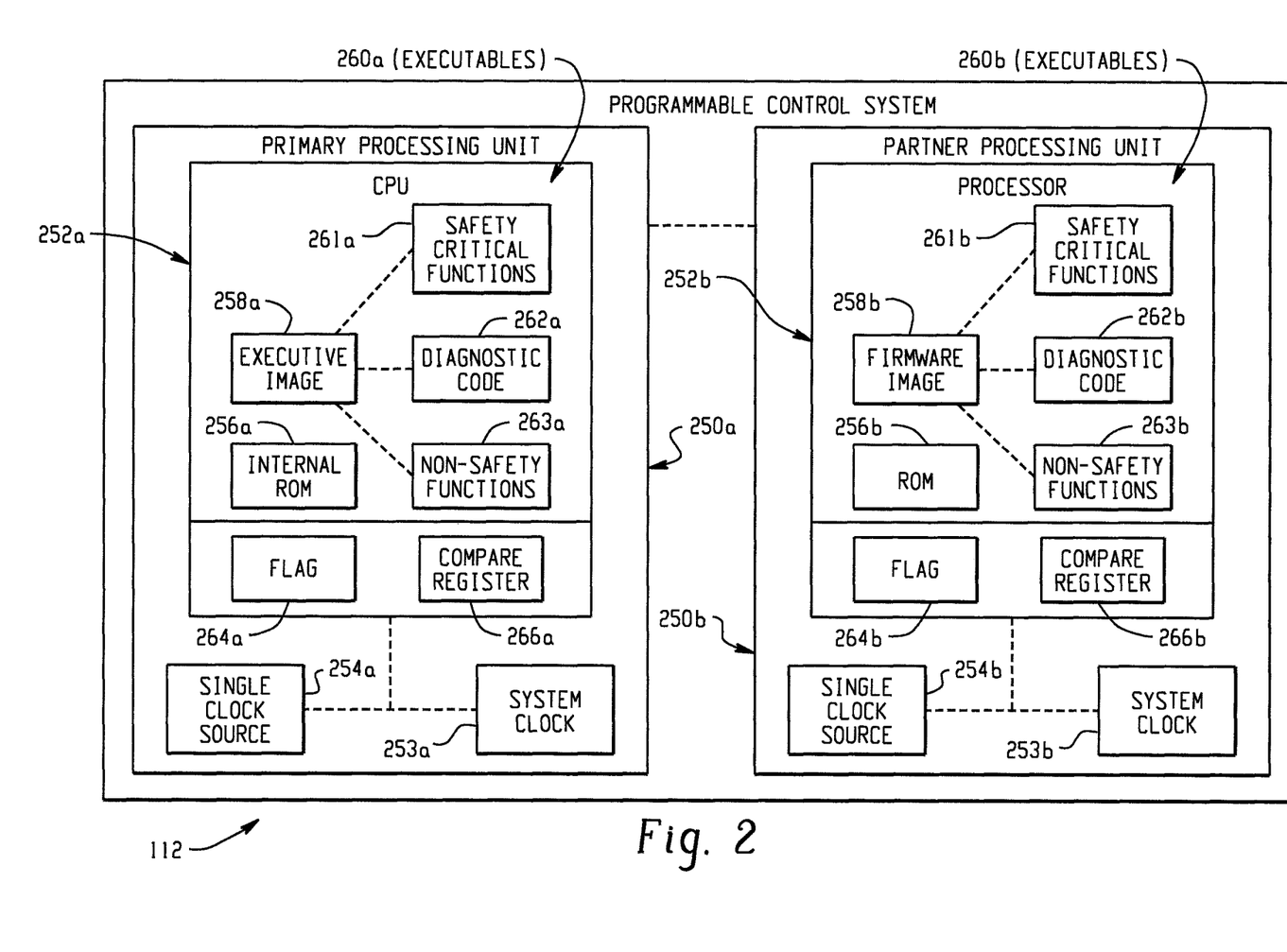
FIG. 2 is a block diagram of an industrial automation controller according to an exemplary embodiment of this disclosure.

Referring now to FIG. 2, I/O module 218 includes a primary processing unit 250a communicating via a serial or parallel communication protocol known in the art to partner processing unit 250b. Primary processing unit 250a includes a first, or controlling processor, or CPU, 252a and a system clock 253a, both of which are driven by a single clock source 254a. The system clock 253a, in a preferred embodiment, increments in one microsecond intervals. The CPU 252a has an internal non-volatile memory such as, but not limited to, ROM (read only memory), flash memory and non-volatile RAM (Random Access Memory) 256a which holds an executive, or firmware, image 258a of executables 260a comprised of safety critical functions 261a, diagnostic code 262a, and non-safety functions 263a. CPU 252a further includes a flag 264a and a timer interrupt function implemented with a compare register 266a wherein the compare register 266a is loaded with a preset time value. When the system clock 253a reaches the value stored in the compare register 266a, CPU 252a will interrupt the execution of the executive image 258a. Partner processing unit 250b includes mostly the same, though independent, components including a processor 252b and system clock 253b driven by a single clock source 254b, non-volatile memory 256b, firmware image 258b of slightly different executables 260b comprised of safety critical functions 261b, diagnostic code 262b and non-safety functions 263b, flag 264b and compare register 266b providing the same timer interrupt functionality.

Figure 3:
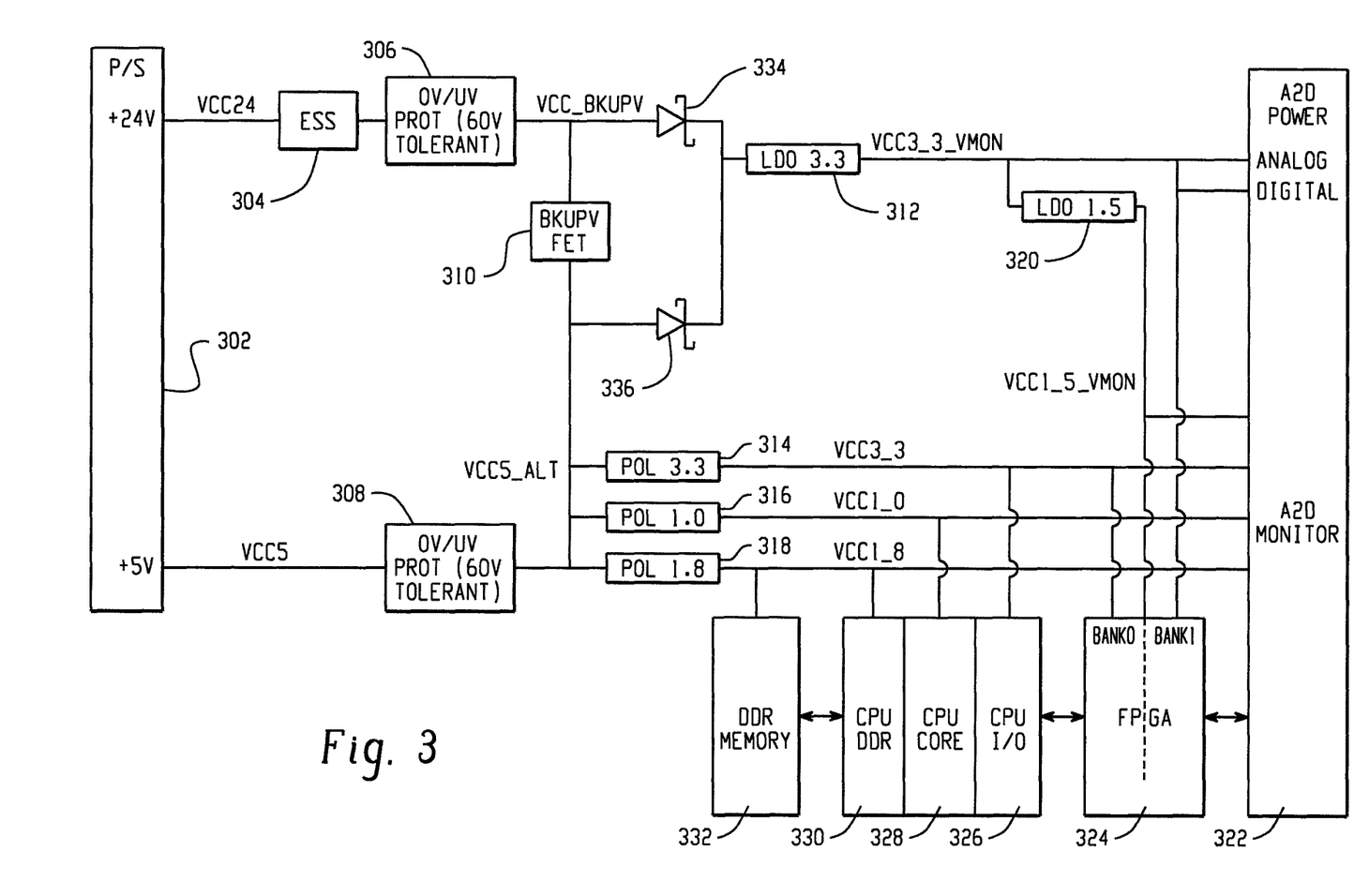
FIG. 3 is a schematic of an industrial controller diagnostic domain subsystem powered with an energy storage subsystem according to an exemplary embodiment of this disclosure.

Referring now to FIG. 3, illustrated is a schematic of an industrial controller diagnostic domain subsystem powered with an energy storage subsystem according to an exemplary embodiment of this disclosure.

According to the exemplary embodiment illustrated, a 24 volt rail VCC24 provides power indirectly to an ESS (Energy Storage Subsystem) 304 which powers FPGA (Field Programmable Gate Array) 324 during normal operation of the controller. FPGA 324 associated with the diagnostic domain of the controller. Moreover, during normal operation of the controller a 5V rail VCC5 provides power indirectly to CPU I/O 326, CPU core 328, CPU DDR (Double Data Rate) 330 and DDR memory 332 associated with the functional domain of the controller.

While the exemplary embodiment described with reference to FIG. 3 includes a first independent power rail VCC24 to provide power to the ESS 304 and an independent second power rail VCC5 to provide power to the functional domain of the controller, it is to be understood that ESS 304 is not limited to being powered by a voltage rail independent from the power rail supply power to the functional domain of the controller. In other words, the powering of the diagnostic domain by the ESS 304 effectively provides independence of the diagnostic domain power source from the functional domain power source in the event the functional domain power source fails due to powering down the industrial control system or a fault associated with an output voltage rail associated with the power supply subsystem.

As shown in FIG. 3, the exemplary power domain/system includes power supply 302, ESS 304, OV/UV Protector 306 and 308, BKUPV FET 310, Zener Diodes 334 and 336, LDO 3.3V 312, POL 3.3V 314, POL 1.0V 316, POL 1.8V 318, LDO 1.5V 320, A2D monitor 322, FPGA 324, CPU I/O 326, CPU core 328, CPU DDR 330 and DDR memory 332.

ESS 304 is energy storage subsystem that stores sufficient limited energy through a capacitor or alternatively a battery to provide device backup power in the event of power loss or fault. ESS 304 includes a boost converter with a high voltage capacitor for storage, and a step-down buck converter to generate backup voltage VCC_BKUPV from the high voltage capacitor within ESS 304. POL 1.0V 316 is used to power CPU core voltage, POL 1.8V is used to power CPU DDR controller 330 and DDR memory 332, and POL 3.3V is used to power CPU and board I/O functions.

POL 3.3V 314, POL 1.0V 316, POL 1.8V 318 are voltage rails deemed as the safety relevant domain. A fault in the safety relevant domain could potentially compromise the safety function. LDO 3.3V 312 is used to power the A2D converter and the FPGA selected bank I/O reserved for diagnostic domain. LDO 1.5V 320 is used to power the FPGA core voltage.

LDO 3.3V 312 and LDO 1.5V 320 are deemed as the diagnostic relevant domain. FPGA 324 and A2D converter 322 form a voltage monitor to continuously monitor safety relevant voltage rails, e.g., POL 3.3V 314, POL 1.0V 316, POL 1.8V 318 within operating range. In the event of over-voltage or under-voltage fault in either safety relevant domain voltage rails, voltage monitor will shut down all POLs and the power supply input rail that powers safety relevant POL through OV/UV protection circuit 308. OV/UV protection circuit 308 offers additional/secondary protection to power supply input rails by monitoring the power supply input voltage to be within an appropriate operating range. In the event of power supply over-voltage or under-voltage fault, OV/UV protection circuit 308 shuts down the faulty supply from POLs. Upon detection of OV/UV fault, voltage monitor will also turn on Backup Voltage MOSFET transistors 310 to insure the POLs are powered by the backup voltage. CPU FW can perform power-fail operation within permittable holdup period limited by ESS 304 before shutting down whole device.

OV/UV protection circuit 306 offers additional/secondary protection to backup voltage rail VCC_BKUPV by monitoring the backup voltage rail to be within an appropriate operating range. In the event of a power supply over-voltage or under-voltage fault, OV/UV protection circuit 306 shuts down the faulty supply utilizing diagnostic relevant domain voltage rails LDO 3.3V 312 and LDO 1.5V 320.

Figure 4:
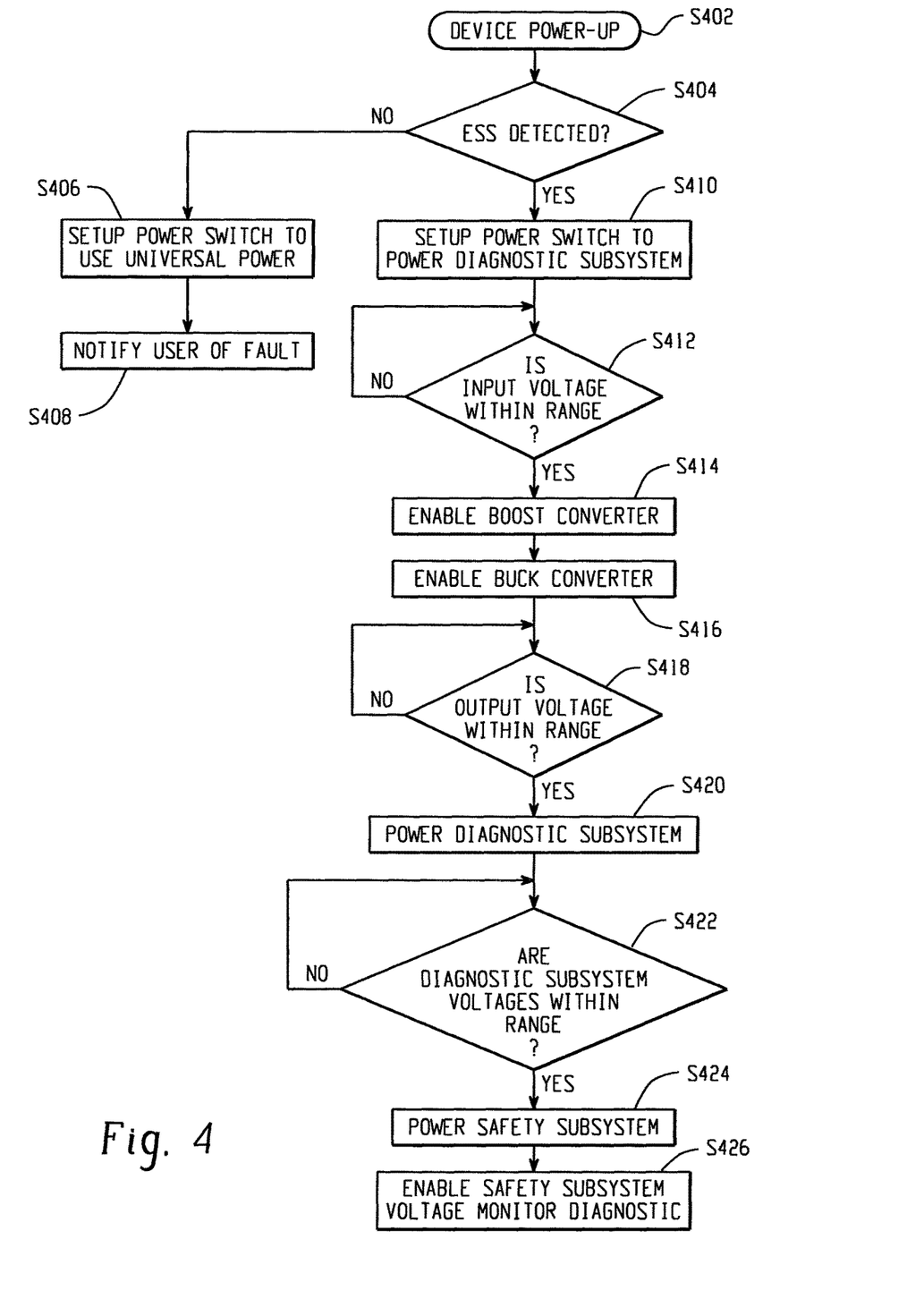
FIG. 4 is a flow chart of a method of powering an industrial controller diagnostic subsystem using an energy storage subsystem according to an exemplary embodiment of this disclosure.

Referring to FIG. 4, illustrated is a flow chart of a method of powering an industrial controller diagnostic subsystem using an energy storage subsystem according to an exemplary embodiment of this disclosure.

Initially, at step S402, the controller device powers up.

Next, at step S404, the method executes a routine to detect if an ESS (energy storage system) is incorporated to the control device. If an ESS device is not detected, step S406 configures the controller to use universal power, for example, one voltage rail such as SVDC to power the functional domain and diagnostic domain. Furthermore, step S408 notifies a user of the control device of a fault in the event an ESS is not detected.

If an ESS is detected at step S404, the method configures control device to power the diagnostic subsystem utilizing ESS generated voltage.

At step S412, the method determines if the input voltage to the ESS is within a predetermined range. If not, the method continues to wait until the ESS voltage is acceptable, then proceeds to step S414.

At step S414, the method enables the ESS boost converter and at step S416, the method enables the ESS buck converter, the boost converter and buck converter conditioning the output of the energy storage drive, i.e., capacitor or battery, to power the diagnostic subsystem.

Next, at step S422, the method determines if the diagnostic domain subsystem voltages are with a predetermined range via a window detector, e.g., analogue to digital monitor 322.

After the method determines the diagnostic domain subsystem operating voltages are acceptable, step S424 enables the powering of the diagnostic domain subsystem, and step S426 enables safety subsystem voltage monitoring diagnostics.

Figure 5:
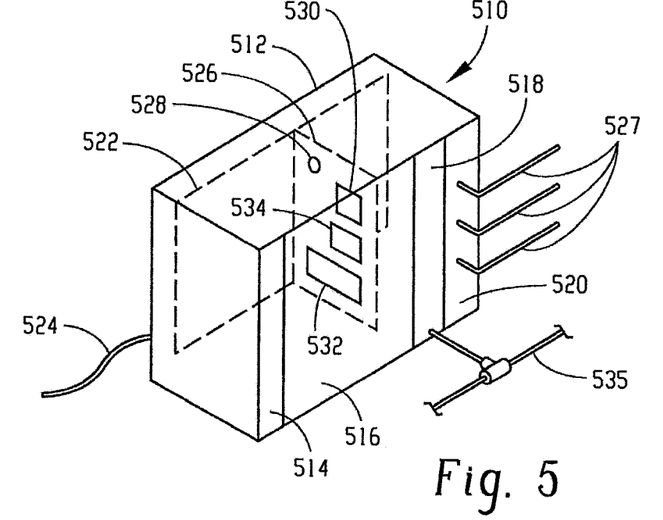
FIG. 5 is a simplified, perspective view of an industrial automation control system including a controller module with an internal back-up power source used to power a diagnostic domain subsystem according to an exemplary embodiment of this disclosure.

FIG. 5 shows another example of an industrial automation controller 510 including a chassis 512 incorporating a number of modules 514, 516, 518, and 520 operably interconnected by means of a modular or fixed size backplane 522. In particular, a power supply module 514 receives electrical line power 524 as input (e.g., about 120 volts AC) and outputs operating power (e.g., about 5 volts DC) for distribution along the backplane 522 to the other modules 516, 518, and 520. A controller module 516 receives data along the backplane 522 from a network module 518 and at least one I/O module 520. The network module 518 provides an interface with a communication network 535 such as EtherNet, or ControlNet to receive system control data or data from other I/O modules and to allow data to be transmitted to/from other devices on the communication network 535. The I/O module 520 provides an interface for input and output signals along I/O lines 527 communicating with the controlled process or machine. Generally, during operation of the industrial controller 510, a program executed by the controller module 516 reads input data from the I/O module (s) and creates output data that are then sent along the backplane 522 to the network module 518 or to an I/O module 520. The controller module 516 includes at least one internal processor circuit board (main circuit board) 526 containing a battery or capacitor back-up electrical power source 528 which can provide an energy storage system (ESS) as previously described, volatile memory 530, and processor circuitry 532. The processor circuitry 532 comprises one or more suitable electronic controller or microprocessor devices such as an ASIC or a general purpose microprocessor that executes a stored control program, a programmable logic controller and/or the like. The battery may be a lithium battery as is generally known in the art. Such batteries are typically not rechargeable and hence must be replaced when their reserve power is below a minimum threshold. A capacitor back-up power source 528 can alternatively be used, but is not replaceable by the end-user and can lose energy capacity by exposure to long-term elevated temperatures. The volatile memory 530 can be, e.g., (synchronous) dynamic random access memory (S)DRAM that requires application of power to maintain its data integrity. Non-volatile memory 534 such as flash memory or disk is also provided. In the event of loss of operating power in the backplane 522 (e.g., due to interruption of the input line power 524 to the power supply module 514), the battery or other back-up power source 528 outputs a required back-up power to the controller module 516 to allow for completion of an "emergency save" operation in which the processor circuitry 532 saves its state (i.e., content of its registers and other volatile memory) and also saves data from the volatile memory 530 to the non-volatile memory 534 using the back-up power supplied by the back-up power source 528.

Whether the back-up power source 528 is a battery or a capacitor, some back-up power sources 528 can be integrated into the controller module 516 and others, as described below, are removably integrated. It is to be understood that an ESS powered diagnostic domain subsystem as disclosed herein can be either integrated with one or more modules or backplanes incorporated to an industrial controller or the ESS can be removably integrated as described below with reference to FIGS. 6-11.

Figure 6:
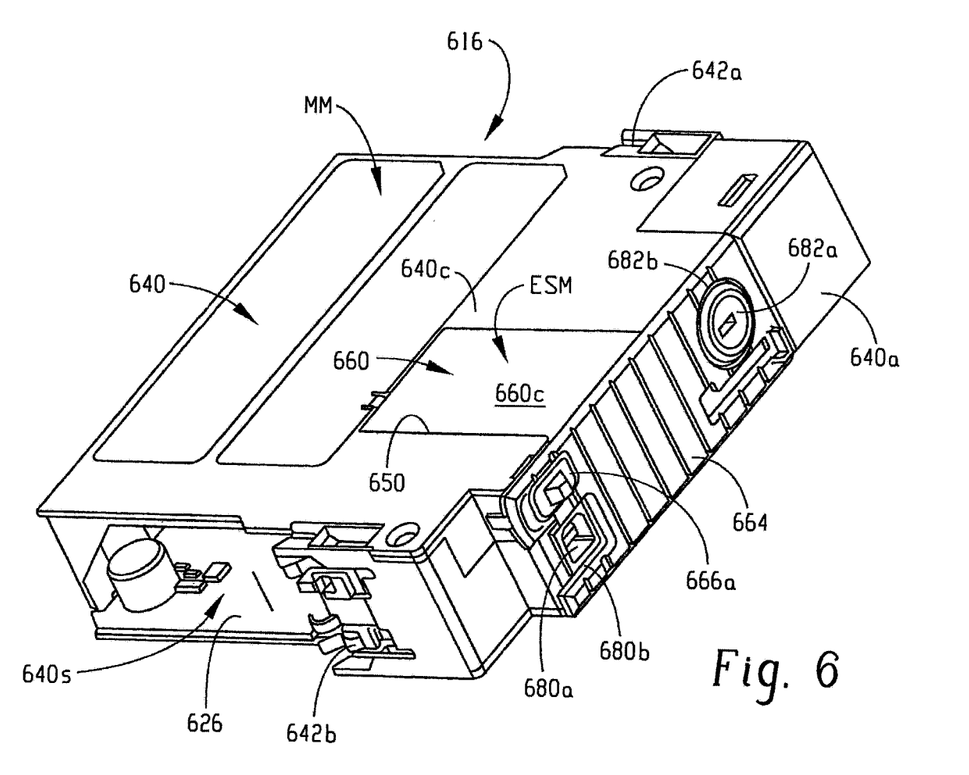
FIG. 6 is an isometric view of a controller module including a removable and replaceable energy storage module which powers a diagnostic domain subsystem according to an exemplary embodiment of this disclosure.
Figure 7:
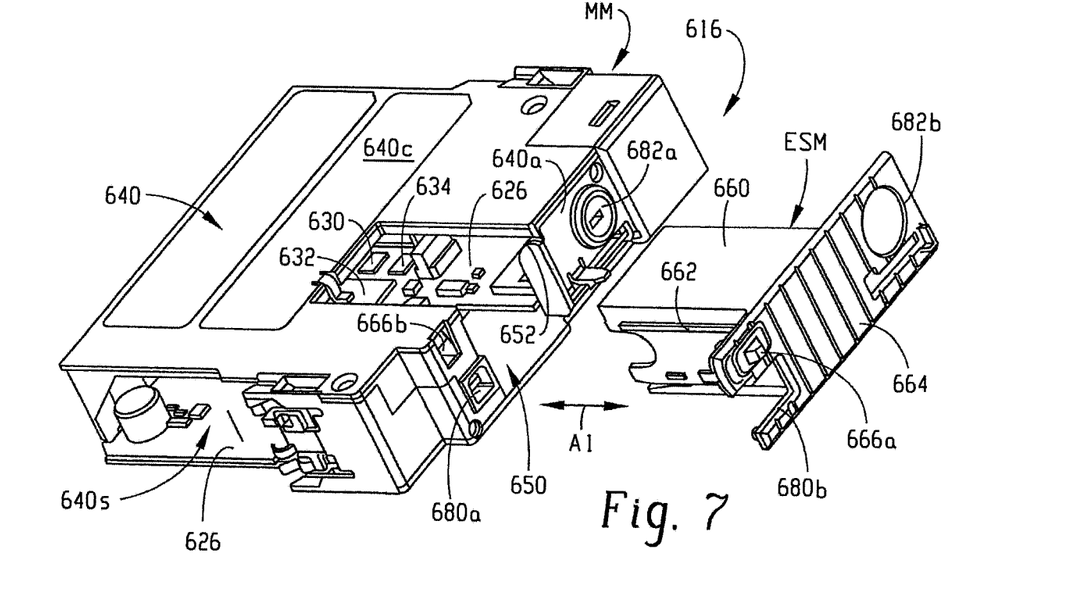
FIG. 7 is similar to FIG. 6 and further shows an energy module separated from a main module portion of the controller module.

FIG. 6 is an isometric view of a controller module including a removable and replaceable energy storage module which powers a diagnostic domain subsystem according to an exemplary embodiment of this disclosure.

In place of an integrated back-up electrical power source 528 used in the controller module 516 of FIG. 5, the controller module 616 comprises a removable and replaceable energy storage module (ESM), indicated by ESM in the drawings. FIG. 6 shows the controller module 616 including its ESM operatively installed. As described in detail below, when the ESM is operatively installed, the ESM is adapted to output sufficient electrical back-up power to controller module 616 during a loss of operating power on the backplane 522 so that the emergency save operation can be completed in which the state of the processor circuitry 632 (its registers and other volatile memory) and any other volatile memory 630 of the controller module 616 can be saved to non-volatile memory 634 such as flash EEPROM, disk, or the like, along with a cyclic redundancy check or checksum to validate the saved data. The data saved to the non-volatile memory 634 can be used in rebooting the controller module 616, fault analysis, etc. Also, as described below, the ESM optionally includes a real-time clock (RTC) with a non-volatile memory (e.g., EEPROM) and a separate back-up power supply dedicated to the real-time clock. The processor circuitry 632 is sometimes referred to as a "processor" comprises one or more suitable electronic controller or microprocessor devices such as an ASIC or a general purpose microprocessor that executes a stored control program, a programmable logic controller and/or the like.

Referring to all of FIGS. 6-9, the controller module 616 comprises a main module MM and the energy storage module ESM connected thereto. The main module MM comprises a main housing 640 defining a space 640s in which the main circuit board 626 is contained (the main circuit board 626 can comprise one or multiple circuit boards). The main housing 640 comprises at least one mounting clip (as shown first and second mounting clips 642a, 642b) that are adapted to mate selectively and releasably with a chassis, rail, enclosure or other mounting location in which the controller module 616 is operatively installed during use, with the main circuit board 626 operatively mated to a backplane through a multi-pin plug-type connector 644 (for transmission of electrical power and data). For example, the main housing 640 can be mounted to the chassis 512 of FIG. 5 and operatively connected to the backplane 522 via plug connector 644 for receiving operating power from the backplane 522 and for sending/receiving data along the backplane 522. It is not intended that the present development be limited to any particular type of installation environment for the controller module 616. The controller module 616 can be designed to be installed in a fixed-size chassis having a fixed-size backplane defined in the chassis, or the backplane can be modular (with or without a chassis or mounting rail for physically mounting the controller module 616) such that the backplane is defined and expanded by each module (power supply 514, controller module 616, network adapter 518, i/o module(s) 520) added to the system.

The main housing 640 of the controller module 616 typically comprises multiple pieces and includes or defines a slot or other opening 650 adapted to receive and retain the ESM as shown in FIG. 6. The ESM can be selectively manually inserted into and separated from the main housing 640 as indicated by the arrow A1 in FIGS. 7 and 8. The slot 650 opens through a front wall 640a and a side wall 640c of the main housing 640. The slot 650 is adapted to receive the ESM in only one orientation, preferably with sliding fit through a front wall 640a of the housing. Accordingly, the housing 640 defines the slot 650 to include one or more mechanical features 652 that must be mated with corresponding mechanical features 662 on the ESM in order for the ESM to be slidably received. In the illustrated example, the slot 650 is defined with one or more axially extending grooves and/or ribs 652 that are adapted to mate slidably with respective axially extending ribs and/or grooves 662 defined by a body 660 of the ESM. The slot 650 is designed with the at least one mechanical feature 652 such that only an ESM having the mating mechanical feature(s) 662 can be operatively received therein.

Figure 8:
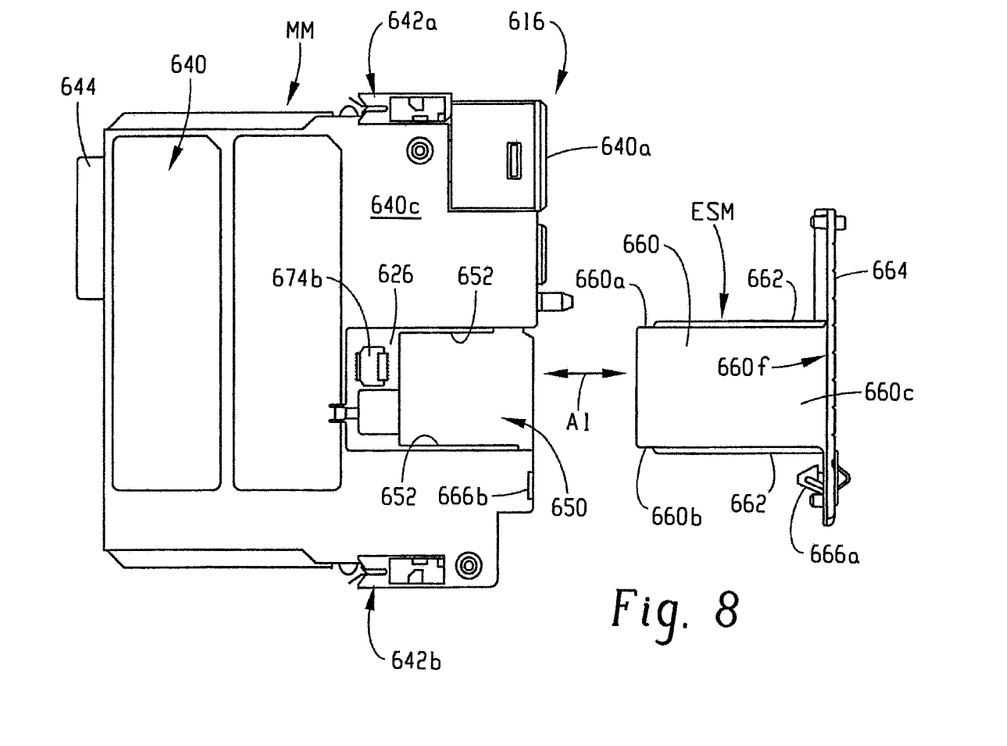
FIG. 8 is similar to FIG. 7 and further shows a left side view of the controller module with the energy module separated from the main module.
Figure 9:
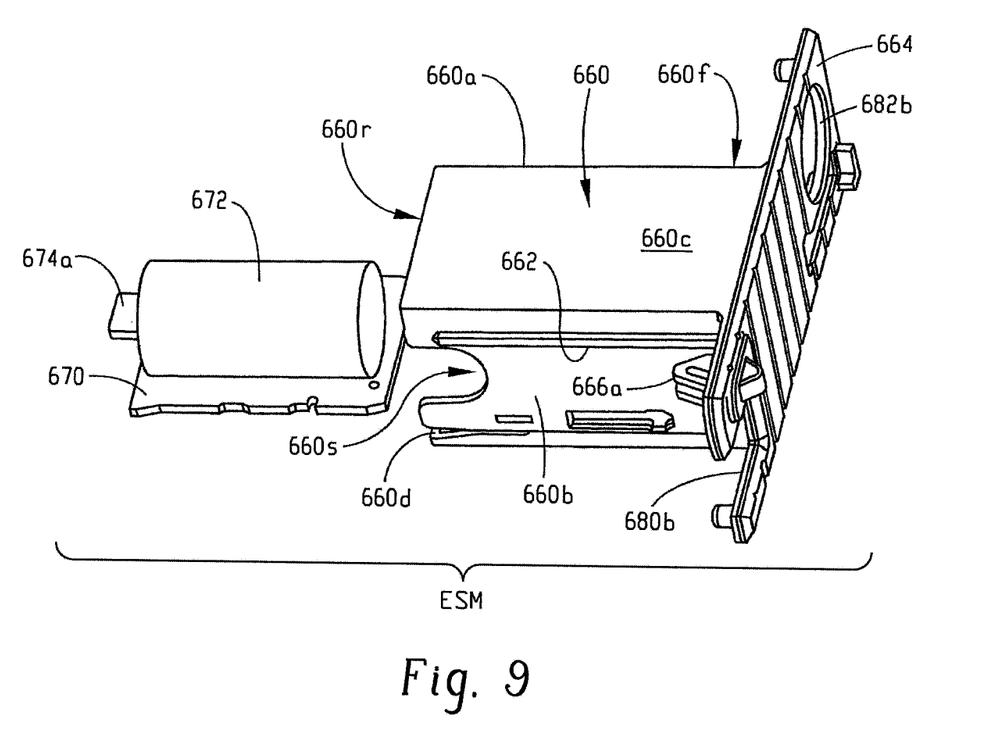
FIG. 9 is an exploded isometric view of the energy module shown in FIGS. 6, 7 and 8 which powers a diagnostic domain subsystem according to an exemplary embodiment of this disclosure.

Referring specifically to FIGS. 8 and 9, the ESM body 660 comprises a hollow tubular or box-like structure defined by spaced-apart upper and lower walls 660a, 660b and spaced-apart left and right side walls 660c, 660d extending between and interconnecting the upper and lower walls. A face plate 664 is connected to and closes a front end 660f of the body and the rear end 660r of the body is open to the space 660s defined between the walls 660a, 660b, 660c, 660d. The ESM includes an ESM circuit board 670 carried by its body 660 in the space 660s (the ESM circuit board 670 can comprise one or multiple circuit boards). The ESM circuit board 670 comprises a back-up electrical power source 672 (shown as a capacitor but that could be a battery or other suitable source of back-up electrical power) connected thereto, along with additional electronic components described below. The ESM circuit board 670 further comprises at least one multi-pin plug connector 674a adapted to mate with a corresponding plug connector 674b (FIG. 8) connected to the main circuit board 626 in the housing 640 when the ESM is operatively mated with the slot 650 as shown in FIG. 6. As such, when the ESM is operatively installed in the ESM slot 650, the connectors 674a, 674b mate for exchange of electrical power and data signals between the ESM circuit board 670 and the main circuit board 626, and when the ESM is removed from the ESM slot 650, the connectors 674a, 674b are disconnected from each other.

When the ESM is fully installed in the slot 650 as shown in FIG. 6, the left side wall 660c thereof lies flush with the left side wall 640c of the controller module main housing 640, preferably with minimal space between the ESM wall 660c and main housing wall 640c so that the ESM wall 660c blocks access to the main module space 640s through the slot 650.

The ESM preferably comprises a latch 666a connected to its face plate 664 and adapted to mate with a catch 666b defined by the main housing 640. When the ESM is mated with the main housing 640, the latch 666a mates with the catch 666b so that the ESM is captured to the main module housing 640 by the latch 666a. The latch 666a is selectively manually releasably to allow separation of the ESM from the main module housing 640, e.g., the latch is defined as a one-piece resilient polymeric structure with the face plate 664 and/or includes a separate biasing spring or the like.

The ESM face plate 664 is conformed and dimensioned so as not to obstruct certain features/structures of the main module MM. For example, the main module MM includes a USB data port 680*a* located in the front wall 640*a* of the main housing 640, and the face plate 664 includes a corresponding opening 680*b* to accommodate same. Similarly, the main module MM comprises a key switch 682*a* adapted to receive a key to control operation of overall control module 616 (on/off/test/program/etc.). The ESM face plate 664 includes a corresponding key switch opening 682*b* adapted to accommodate the key switch 682*a* to allow use of the key switch 682*a* when the ESM is operatively installed. Furthermore, the key switch opening 682*b* is conformed and dimensioned to lie closely adjacent or completely surround the key switch 682*a* such that any key in the key switch 682*a* must be removed from the key switch before the ESM can be separated from the main module MM, i.e., any key in the key switch will interfere with the face plate 664 of the ESM if removal of the ESM is attempted without first removing the key from the key switch 682*a* (which helps to ensure that the key will not be turned to change the state of the key switch while the ESM is separated from the main module MM).

Figure 10:
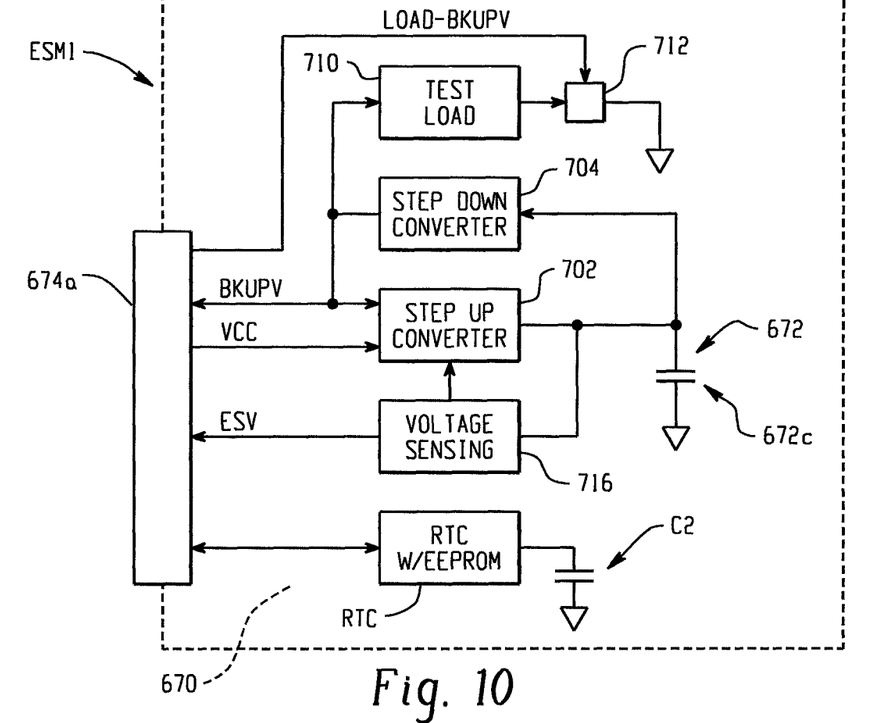
FIG. 10 is a block diagram of an energy storage subsystem configured with a capacitor as a back-up electrical power source, used to power a diagnostic subsystem according to an exemplary embodiment of this disclosure.

FIG. 10 shows a diagrammatic view of a capacitor embodiment of the ESM, designated ESM1. More particularly, the ESM back-up power source 672 comprises a capacitor 672C that charges from operating power supplied from the main module MM during ordinary operation of the controller module 616, and that supplies back-up power to the controller module 616, including the main circuit board 626 and processor circuitry 632 and other components of the main module MM (and the ESM itself) in case of loss of operating power on the backplane 522 (due to interruption of the line power 524 input to the power supply module 514 or another cause) so that the emergency save operation can be completed as described above. As noted above, the ESM circuit board 670 includes back-up power circuitry connected to the main circuit board 526 of the main module MM through a plug interface 674*a*/674*b*.

More particularly, ESM input electrical power Vcc (e.g., 4.75 to 5.25 volts) is supplied to the ESM circuit board 670 sourced from the backplane operating power. The ESM input voltage Vcc is input to a step up converter 702 that increases the voltage to a charging voltage that is output to the capacitor 672*c* for charging the capacitor. In one example, the capacitor is rated to 400 volts and the step up converter outputs 350 volts for charging the capacitor 672*c*. Likewise, the capacitor 672*c* stores a back-up voltage that is output through a step down converter 704 that supplies the back-up operating voltage BKUPV (e.g., 4 to 5 volts DC) to the controller module 616 to complete the emergency save operation. In one example, the step up converter and step down converter can be provided by respective flyback transformers.

In one embodiment, the ESM comprises a test load 710 (e.g., a resistor) and switch means 712 controlled by the processor 632 of the main circuit board 526 by a signal LOAD_BKUPV for selectively powering the test load 210 from the step down converter 704 to measure the reserve power of the capacitor 672*c* during a test mode. A voltage sensor 716 monitors the voltage of the capacitor 672*c* during the test mode, and outputs a test output voltage level ESV to the main circuit board 526. The processor circuitry 532 calculates the reserve power of the capacitor 672*c* based upon the changes in the test output voltage level ESV during the test mode, which will last only a short time, e.g., a fraction of a second. In an alternative method, starting from the regulated capacitor full voltage level, the test load 710 is connected to the capacitor until the capacitor voltage level decreases to a threshold voltage, and the elapsed time for this known voltage drop is used to calculate the reserve power of the fully charged capacitor. The processor circuitry 532 will compare the calculated reserve power of the capacitor 672*c* to the known required reserve power required for an emergency save operation, which will vary depending upon the processor circuitry 532, and the type and size of the volatile memory 530 and non-volatile memory 534, and the size of the program being run by the processor circuitry 532. If the calculated reserve power is not at least equal to the known required reserve power to complete the emergency save operation, the processor circuitry 532 will determine that the capacitor 672*c* of the ESM lacks sufficient reserve capacity to perform the emergency save effectively and will initiate a fault condition which can lead to an audible and/or visual (e.g., LED or the like) output from the control module 616 to indicate such fault condition, in which case the ESM can be replaced. If operating power to the main module MM is interrupted during the test mode, the processor circuitry immediately exits the test mode and initiates the emergency save operation. The test load 710 is also used for regulation of the output BKUPV of the step down converter 704, which helps to improve the accuracy of the reserve power calculated during test mode.

The capacitor ESM (ESM1) preferably further comprises a real-time clock RTC that interfaces with the main circuit board 526 including the processor circuitry 532. In the illustrated example, the real-time clock RTC is powered by a separate capacitor C2, e.g., a supercapacitor that can power the real-time clock for a minimum of five days. The real-time clock RTC comprises non-volatile memory such as an EEPROM that is used to store configuration parameters of the ESM as described further below. The real-time clock is also used to validate the overall capacity of the ESM capacitor 672*c* after completion of the emergency save operation, as described further below.

For safety, the capacitor based ESM (ESM1) is configured such that upon separation of the ESM from the main module MM, the capacitor 672*c* will automatically discharge itself, e.g., through the test load 710 as controlled by switch 712. In one embodiment, separation of the capacitor based ESM (ESM1) from the main module MM will cause the ESM to enter the above-described test mode, which will cause the stored capacitive energy to be discharged in less than one minute.

Figure 11:
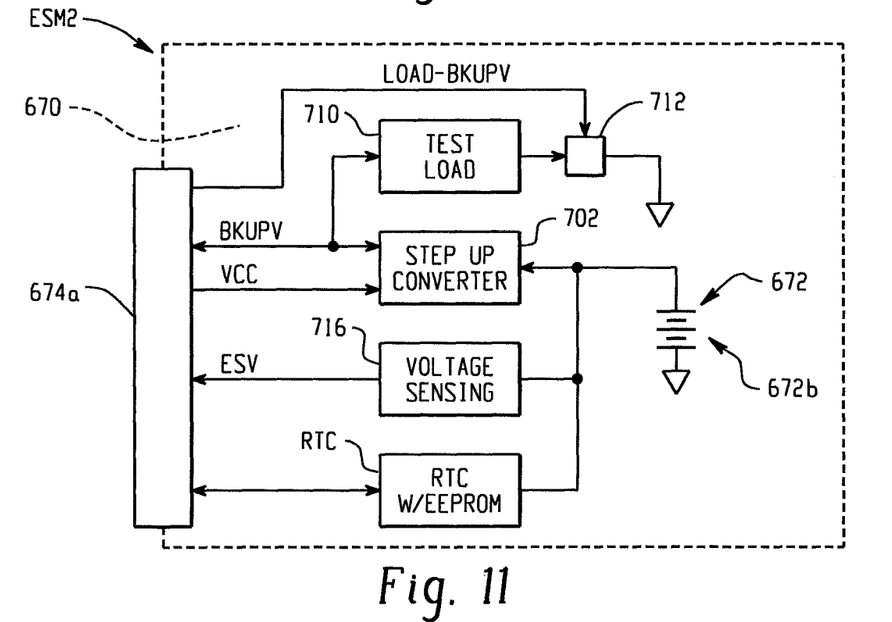
FIG. 11 is a block diagram of an energy storage subsystem configured with a battery as a back-up electrical power source, used to power a diagnostic subsystem according to an exemplary embodiment of this disclosure.

FIG. 11 is similar to FIG. 10, but shows a diagrammatic view of a battery embodiment of the ESM, designated ESM2. More particularly, the back-up power source 672 comprises a battery 672*b* that supplies back-up power to the controller module 616, including the main circuit board 526 and processor circuitry 532 and other components of the main module MM (and the ESM itself), in case of loss of operating power on the backplane 522 (due to interruption of the line power 524 input to the power supply module 514 or another cause) so that the emergency save operation can be completed. The back-up power circuitry of the ESM circuit board 670 is connected to the main circuit board 526 of the main module MM through the plug interface 674*a*/674*b* described above or other means for power and data transmission.

ESM input electrical power Vcc (e.g., 4.75 to 5.25 volts) is supplied to the ESM circuit board 670 sourced from the backplane operating power. If the battery 672B is rechargeable, the ESM input voltage Vcc is used to charge the battery 672B as controlled by the processor circuitry 532, optionally by boosting the ESM input voltage Vcc through a step up converter 702 (or step down of the ESM input voltage Vcc through a step down converter) if required. The battery 672B stores a back-up voltage (e.g., 3 volts) that is output to the step up converter 702 (or a step down converter 704 (FIG. 10) depending upon the voltage of the battery 672B) that outputs the back-up operating voltage BKUPV (e.g., 4 to 5 volts DC) to the controller module 616 to complete the emergency save operation.

As with the capacitor ESM (ESM1) the illustrated battery ESM (ESM2) comprises a test load 710 (e.g., a resistor) and switch means 712 controlled by the processor 532 of the main circuit board 526 through a signal LOAD_BKUPV for selectively powering the test load 710 from the boost converter 702 to measure the reserve power of the battery 672B during a test mode. A voltage sensor 716 monitors the voltage of the battery 672B during the test mode, and outputs a test output voltage level ESV to the main circuit board 526. The processor circuitry 532 calculates the reserve power of the battery 672B based upon the changes in the test output voltage level ESV during the test mode, which will last only a short time, e.g., less than one second. The processor circuitry 532 will compare the calculated reserve power to its known required reserve power for an emergency save operation, which will vary depending upon the processor circuitry 532, and the type and size of the volatile memory 530 and non-volatile memory 534, and the size of the program being run by the processor circuitry 532. If the calculated reserve power is not at least equal to the known required reserve power to complete the emergency save operation, the processor circuitry 532 will determine that the battery 672B of the ESM lacks sufficient reserve capacity to perform the emergency save effectively and will initiate a fault condition which can lead to an audible and/or visual (e.g., LED or the like) output from the control module 616 to indicate such fault condition, in which case the ESM can be replaced. If the operational power supplied from the backplane 522 to the main module MM fails during the test mode, the processor circuitry immediately terminates the test mode and initiates the emergency save operation.

The battery ESM (ESM2) preferably further also comprises a real-time clock RTC that interfaces with the main circuit board 526 including the processor circuitry 532. As shown, the real-time clock RTC is powered by the ESM battery 672B, but a separate battery or capacitor can be provided to power the real-time clock. The real-time clock RTC comprises non-volatile memory such as an EEPROM that is used to store configuration parameters of the ESM as described further below.

To preserve battery life, the battery based ESM (ESM2) is configured such that upon separation of the ESM from the main module MM, the battery is isolated from loads on the ESM circuit board 570 except the real-time clock RTC, to extend the battery life a maximum possible extent.

Both the capacitor and battery ESM (ESM1, ESM2) include non-volatile memory such as the EEPROM provided as part of the real-time clock RTC. This non-volatile memory is programmed to include configuration parameters that identify the type of back-up power source 672 in the ESM (capacitor, battery, etc.), the nominal or rated capacity of the back-up power source 672 (e.g., 220 uF, 350V capacitor or 3 volt battery, etc.). In one embodiment, the non-volatile memory of the ESM includes a serial number or like unique identifier for the ESM, so that same can be logged as part of any emergency save operation or as otherwise required. Certain of these configuration parameters can also be set using a jumper device on the ESM circuit board 670, e.g., to identify the ESM as either battery or capacitor based.

Also, during operation of the ESM, the non-volatile memory can be updated to include results from the above-described test mode with respect to the reserve power capacity of the back-up power source 672. Similarly, in the case of the capacitor based ESM (ESM1), the duration of the emergency save operation is logged by the real-time clock RTC, and the capacitor 672C is further operated with a load at least equal to that of the emergency save operation to supply back-up power (e.g., through the test load 710) after completion of the emergency save operation in order to measure any residual reserve power capacity until depletion of the capacitor, and this information is also stored to the real-time clock EEPROM or other non-volatile memory for later use in assessing or validating the maximum reserve power capacity of the capacitor relative to the power requirements of the emergency save operation. For example, upon the next power up of the controller module 616, the main module processor circuitry 532 can calculate the ratio of the duration of the emergency save operation to the total operation time of the ESM (the duration of the emergency save operation+the duration from completion of the emergency save operation to depletion of the capacitor) to validate the ESM for a the back-up power requirements (program size, memory size, etc.) of the particular main module. If the ratio is above a threshold, the ESM will be deemed to have insufficient back-up energy capacity for future use with the particular main module, i.e., the ESM will be deemed to have insufficient excess energy capacity.

The processor circuitry 532 of each main module MM can be preprogrammed to accept an ESM with only certain configuration parameters stored in the non-volatile memory of the real-time clock RTC or elsewhere. For example, if the main module MM is to be used in a mining application, the processor circuitry will be programmed to accept only a capacitor based ESM (ESM1) and to initiate a fault condition with visual and/or audible warnings if a battery based ESM (ESM2) is operatively installed in the slot 550. Similarly, the processor circuitry 532 can be programmed to accept an ESM only if the back-up power source 672 of the ESM is rated to sufficient reserve power capacity to complete an emergency save operation for the particular processor circuitry 132, type/size volatile memory, size of the program being executed by the processor circuitry and the like. Here, again, if an ESM with insufficient reserve power capacity is installed in the slot 550 of the main module MM, a fault condition will be indicated.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. An industrial automation control system comprising:
   a power supply subsystem including a first output voltage rail and a second output voltage rail;
   a functional domain subsystem including processor circuitry, volatile memory and non-volatile memory configured to monitor and/or control one or more remote devices operatively associated with the industrial automation control system, and the functional domain subsystem operatively powered by the first output voltage rail during a normal mode of operation;
   a diagnostic domain subsystem configured to perform diagnostics of one or more conditions associated with the functional domain subsystem; and
   an energy storage subsystem operatively connected to the second output voltage rail and configured to store energy supplied from the second output voltage rail during the normal mode of operation and operatively power the diagnostic subsystem using the stored energy during the normal mode of operation, and the energy storage subsystem configured to operatively power the diagnostic subsystem and functional domain subsystem during a control system operation associated with a failure of one or more of the first output voltage rail and second output voltage rail due to one or more of powering down the industrial automation control system, a fault associated with the first output voltage rail, and a fault associated with the second output voltage rail.

2. The industrial automation control system according to claim 1, wherein the energy storage subsystem includes one of a battery and a capacitor to store energy.

3. The industrial automation control system according to claim 1, wherein the power supply subsystem is a backplane operatively connected to one or more modules housing the functional domain subsystem, the diagnostic domain subsystem and the energy storage subsystem.

4. The industrial automation control system according to claim 1, the energy storage subsystem comprising:
   an energy storage device;
   a boost converter, operatively associated with stepping-up an input voltage provided by the second output voltage rail to charge the energy storage device; and
   a buck converter operatively associated with stepping down an output voltage provided by the energy storage device to power the diagnostic domain subsystem.

5. The industrial automation control system according to claim 1, the diagnostic domain subsystem comprising:
   a voltage monitor operatively associated with monitoring one or both of the first output voltage rail and the second output voltage rail; and
   an integrated circuit operatively associated with processing voltage levels provided by the voltage monitor.

6. The industrial automation control system according to claim 1, wherein the functional domain subsystem includes a primary controller and a partner controller.

7. The industrial automation control system according to claim 1, wherein the energy storage subsystem is removably connected to a main module and adapted for selective manual separation from the main module.

8. The industrial automation control system according to claim 1, wherein the energy storage subsystem is configured to supply power to the functional domain subsystem to execute an emergency save operation in which the functional domain subsystem saves data to the non-volatile memory.

9. The industrial automation control system according to claim 1, comprising:
a switching device operatively associated with switching power provided to the functional domain subsystem from the first output voltage rail to an output voltage associated with the energy storage subsystem.

10. An industrial automation control system implemented method for powering a diagnostic domain subsystem associated with the industrial automation control system, the industrial automation control system including a power supply subsystem including a first output voltage rail and a second output voltage rail, a functional domain subsystem operatively powered by the first output voltage rail and configured to monitor and/or control one or more remote device associated with the industrial automation control system, a diagnostic domain subsystem configured to perform diagnostics of one or more conditions associated with the functional domain subsystem, and an energy storage subsystem operatively connected to the second output voltage rail and configured to store energy from the second voltage rail and operatively power the diagnostic domain subsystem during a normal mode of operation and operatively power the functional domain subsystem and diagnostic domain subsystem during a control system operation associated with a failure of one or more of powering down the industrial automation control system, a fault associated with the first output voltage rail, and a fault associated with the second output voltage rail, the method comprising:
a) monitoring an output voltage of the energy storage subsystem;
b) determining if the output voltage is within a predetermined range; and
c) if the output voltage is within the predetermined range, selectably powering the diagnostic domain subsystem.

11. The industrial automation control system implemented method according to claim 10, further comprising:
a1) monitoring an input voltage to the energy storage subsystem;
a2) determining if the input voltage is within a predetermined range; and
a3) if the input voltage is within the predetermined range, enabling a boost converter and buck converter to condition the input voltage and generate the output voltage of the energy storage subsystem.

12. The industrial automation control system implemented method according to claim 11, further comprising:
c1) if the output voltage is within the predetermined range, selectively power the diagnostic domain subsystem including monitoring of one or more voltages.

13. The industrial automation control system implemented method according to claim 11, further comprising:
d1) monitoring an output voltage associated with the first output rail;
d2) determining if the output voltage associated with a first output rail is outside a predetermined range;
d3) if the output voltage associated with the first output rail is outside the predetermined range, selectably applying an output of the energy storage subsystem to power the functional domain subsystem; and
d4) performing an emergency save operation in which the functional domain subsystem saves data to a non-volatile memory.

14. The industrial automation control system method according to claim 10, wherein the energy storage subsystem includes a capacitor to store energy.

15. The industrial automation control system method according to claim 10, wherein the power supply subsystem is a backplane operatively connected to one or more modules housing the functional domain subsystem, the diagnostic domain subsystem and the energy storage module.

16. The industrial automation control system implemented method according to claim 10, the diagnostic domain subsystem comprising:
a voltage monitor operatively associated with monitoring one or both of a first output voltage rail and a second output voltage rail; and
an integrated circuit operatively associated with processing voltage levels provided by the voltage monitor.

17. The industrial automation control system implemented method according to claim 10, wherein the functional domain subsystem includes a primary controller and a partner controller.

18. The industrial automation control system implemented method according to claim 10, wherein the energy storage subsystem is removably connected to a main module and adapted for selective manual separation from the main module.

19. An integrated functional safety controller comprising:
a main module comprising:
a first processor and associated circuitry;
a second processor and associated circuitry;
volatile memory;
non-volatile memory; and
an energy storage subsystem, the main module configured to provide a functional domain subsystem to monitor and/or control one or more remote devices, and provide a diagnostic domain subsystem configured to monitor and store in the non-volatile memory one or more conditions associated with the functional domain subsystem;
a backplane operatively associated with the main module, the backplane configured to provide a first output voltage rail and a second output voltage rail operatively associated with powering the main module,
wherein the main module and backplane are configured to power the functional domain subsystem by the first output voltage rail during a normal mode of operation, and the energy storage subsystem is operatively connected to the second output voltage rail and stores energy supplied from the second voltage rail during the normal mode of operation and operatively power the diagnostic subsystem using the stored energy during the normal mode of operation, and the energy storage subsystem operatively powers the diagnostic subsystem and functional domain subsystem during a control system operation associated with a failure of one or both of the first output voltage rail and the second output voltage rail due to one or more of powering down the controller, a fault associated with the first output voltage rail, and a fault associated with the second output voltage rail.

20. The integrated functional safety controller according to claim 19, wherein the energy storage subsystem includes a capacitor to store energy.

21. The integrated functional safety controller according to claim 19, the energy to rage subsystem comprising:
- an energy storage device;
- a boost converter, operatively associated with stepping-up an input voltage provided by the second output voltage rail to charge the energy storage device; and
- a buck converter operatively associated with stepping down an output voltage provided by the energy storage device to power the diagnostic domain subsystem.

22. The integrated functional safety controller according to claim 19, the diagnostic domain subsystem comprising:
- a voltage monitor operatively associated with monitoring one or both of the first output voltage rail and the second output voltage rail; and
- an integrated circuit operatively associated with processing voltage levels provided by the voltage monitor.

23. The integrated functional safety controller according to claim 19, wherein the energy storage subsystem is removably connected to a main module and adapted for selective manual separation from the main module.

24. The integrated functional safety controller according to claim 19, wherein the energy storage subsystem is configured to supply power to the functional domain subsystem to execute an emergency save operation in which the functional domain subsystem saves data to the non-volatile memory.

25. The integrated functional safety controller according to claim 19, comprising:
- a switching device operatively associated with switching power provided to the functional domain subsystem from the first output voltage rail to an output voltage associated with the energy storage subsystem.

* * * * *